United States Patent
Hager et al.

(10) Patent No.: US 9,683,602 B2
(45) Date of Patent: Jun. 20, 2017

(54) SLIDE BEARING SET

(71) Applicant: Miba Gleitlager Austria GmbH, Laakirchen (AT)

(72) Inventors: Gunther Hager, Micheldorf (AT); Johannes Sebastian Hoelzl, Berg im Attergau (AT); Alexander Kari, Fuschl am See (AT)

(73) Assignee: Miba Gleitlager Austria GmbH, Laakirchen (DE)

( * ) Notice: Subject to any disclaimer, the term of this patent is extended or adjusted under 35 U.S.C. 154(b) by 116 days.

(21) Appl. No.: 14/763,006

(22) PCT Filed: Jan. 27, 2014

(86) PCT No.: PCT/AT2014/050028
§ 371 (c)(1),
(2) Date: Jul. 23, 2015

(87) PCT Pub. No.: WO2014/117195
PCT Pub. Date: Aug. 7, 2014

(65) Prior Publication Data
US 2015/0369284 A1    Dec. 24, 2015

(30) Foreign Application Priority Data
Jan. 30, 2013  (AT) .............................. A 50064/2013

(51) Int. Cl.
*F16C 33/10*  (2006.01)
*F16C 37/00*  (2006.01)
(Continued)

(52) U.S. Cl.
CPC ........ *F16C 33/1065* (2013.01); *F16C 17/107* (2013.01); *F16C 17/26* (2013.01);
(Continued)

(58) Field of Classification Search
CPC .... F16C 17/107; F16C 17/26; F16C 33/1045; F16C 33/1055; F16C 33/1065; F16C 33/108; F16C 2360/31
See application file for complete search history.

(56) References Cited

U.S. PATENT DOCUMENTS 2,318,114 A    5/1943  Tichvinsky
3,539,035 A    11/1970 Wolkenstein
(Continued)

FOREIGN PATENT DOCUMENTS

AT         509 624 A1       10/2011
BE    EP 2662598 A1 *  11/2013  ............ F16C 17/107
(Continued)

OTHER PUBLICATIONS

International Search Report of PCT/AT2014/050028, mailed Jun. 3, 2014.
(Continued)

*Primary Examiner* — Phillip A Johnson
(74) *Attorney, Agent, or Firm* — Collard & Roe, P.C.

(57) ABSTRACT

The invention relates to a slide bearing set (4), comprising a slide bearing combination consisting of a radial bearing (6) with a radial bearing slide surface (7) and comprising a first axial bearing (8) with an axial bearing slide surface (9), wherein the first axial bearing (8) is arranged next to the radial bearing (6) in an axial direction (10), and with a lubricant supply device, which comprises a supply line (20) for a lubricant to the radial bearing slide surface (7) of the radial bearing (6). At least one first transversal groove (22) is disposed in the radial bearing (6) such that at least one part of the lubricant is deviated towards the first axial bearing (8) and the first axial bearing (8) can be supplied with the lubricant solely via the radial bearing (6).

10 Claims, 2 Drawing Sheets

(51) Int. Cl.
  *F16C 17/10* (2006.01)
  *F16C 17/26* (2006.01)
  *F03D 80/70* (2016.01)

(52) U.S. Cl.
  CPC ........ *F16C 33/107* (2013.01); *F16C 33/1045* (2013.01); *F16C 37/002* (2013.01); *F03D 80/70* (2016.05); *F05B 2240/53* (2013.01); *F05B 2260/4031* (2013.01); *F16C 2360/31* (2013.01); *F16C 2361/65* (2013.01)

(56) References Cited

U.S. PATENT DOCUMENTS

| | | | |
|---|---|---|---|
| 3,736,705 | A | 6/1973 | Ryan et al. |
| 3,821,908 | A | 7/1974 | Marsch et al. |
| 3,822,607 | A | 7/1974 | Tharaldsen |
| 4,083,612 | A | 4/1978 | Olson |
| 4,271,928 | A | 6/1981 | Northern |
| 4,878,820 | A | 11/1989 | Doi et al. |
| 4,939,827 | A | 7/1990 | Iizuka |
| 5,102,379 | A | 4/1992 | Pagluica et al. |
| 5,529,399 | A | 6/1996 | Holze |
| 5,743,658 | A | 4/1998 | Vollmer et al. |
| 6,471,404 | B1 * | 10/2002 | Gozdawa ............ F16C 32/0688 384/100 |
| 6,602,158 | B2 | 8/2003 | Wildeshaus |
| 6,929,402 | B1 | 8/2005 | Titus |
| 7,967,712 | B2 | 6/2011 | Nakamura et al. |
| 8,272,990 | B2 | 9/2012 | Hagedorn et al. |
| 8,298,108 | B2 | 10/2012 | Nishida et al. |
| 8,578,806 | B2 | 11/2013 | Leimann et al. |
| 8,840,521 | B2 | 9/2014 | Kari et al. |
| 2008/0268997 | A1 | 10/2008 | Gooden |
| 2009/0247348 | A1 | 10/2009 | Haupt et al. |
| 2011/0140448 | A1 | 6/2011 | Takeuchi et al. |
| 2011/0176907 | A1 | 7/2011 | Groves et al. |
| 2011/0223009 | A1 | 9/2011 | Grann et al. |
| 2011/0235210 | A1 | 9/2011 | Himeno et al. |
| 2012/0108380 | A1 | 5/2012 | Dinter et al. |
| 2012/0224799 | A1 * | 9/2012 | Wagner ................ F16C 17/04 384/308 |

FOREIGN PATENT DOCUMENTS

| | | |
|---|---|---|
| CN | 101956676 A | 1/2011 |
| CN | 201802752 U | 4/2011 |
| CN | 102223006 A | 10/2011 |
| DE | 19 85 822 U | 5/1968 |
| DE | 1 425 132 A1 | 12/1968 |
| DE | 1 650 681 A1 | 11/1970 |
| DE | 22 29 235 A1 | 1/1973 |
| DE | 2 357 399 A1 | 5/1974 |
| DE | 33 18 967 A1 | 2/1984 |
| DE | 38 17 312 A1 | 12/1988 |
| DE | 43 36 915 A1 | 5/1995 |
| DE | 195 46 974 A1 | 6/1997 |
| DE | 199 60 157 A1 | 6/2001 |
| DE | 11 2007 000 884 B4 | 2/2009 |
| DE | 20 2010 000914 U1 | 4/2010 |
| DE | 10 2010 000 809 A1 | 1/2011 |
| EP | 1 353 082 A1 | 10/2003 |
| EP | 2 063 139 A1 | 5/2009 |
| EP | 2 221 510 A1 | 8/2010 |
| EP | 2 284 420 B1 | 2/2011 |
| EP | 2 383 480 A1 | 11/2011 |
| EP | 2 489 902 A1 | 8/2012 |
| FR | 1 110 347 A | 2/1956 |
| GB | 712 079 A | 7/1954 |
| JP | S48 27143 A | 8/1973 |
| JP | S48 96382 U | 12/1973 |
| JP | S58 49017 U | 4/1983 |
| JP | S61 75520 U | 5/1986 |
| JP | S61 241522 A | 10/1986 |
| JP | S62 151426 A | 7/1987 |
| JP | 2000-320649 A | 11/2000 |
| WO | 2011/127509 A1 | 10/2011 |

OTHER PUBLICATIONS

International Search Report of PCT/AT2014/050029, mailed Jul. 17, 2014.

International Search Report of PCT/AT2014/050030, mailed Jul. 8, 2014.

* cited by examiner

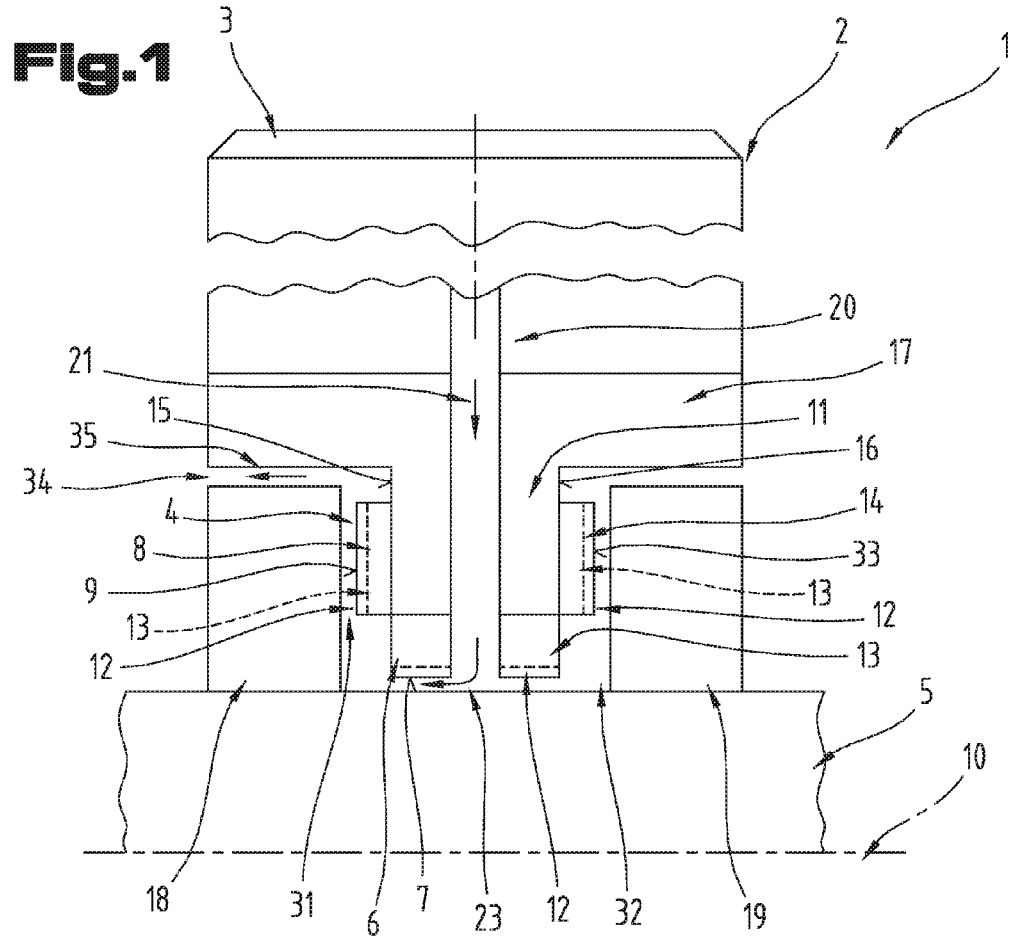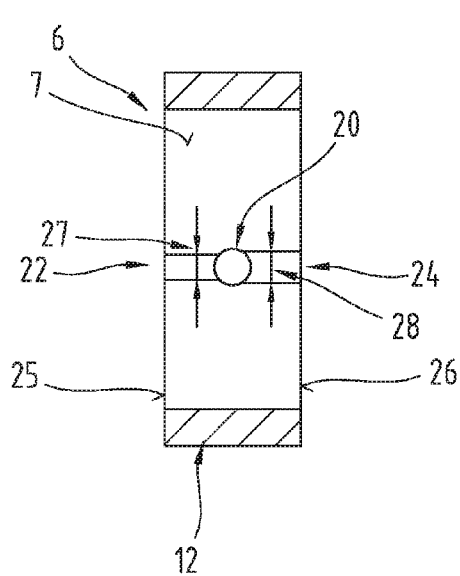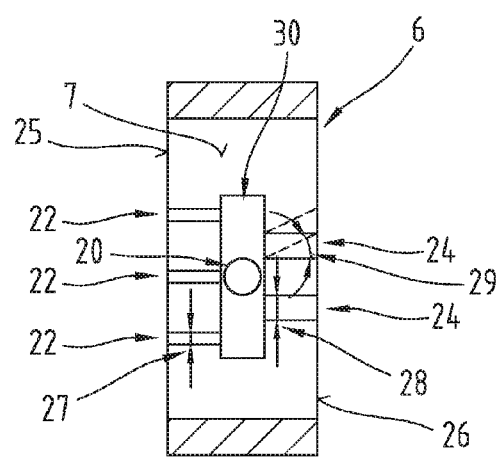

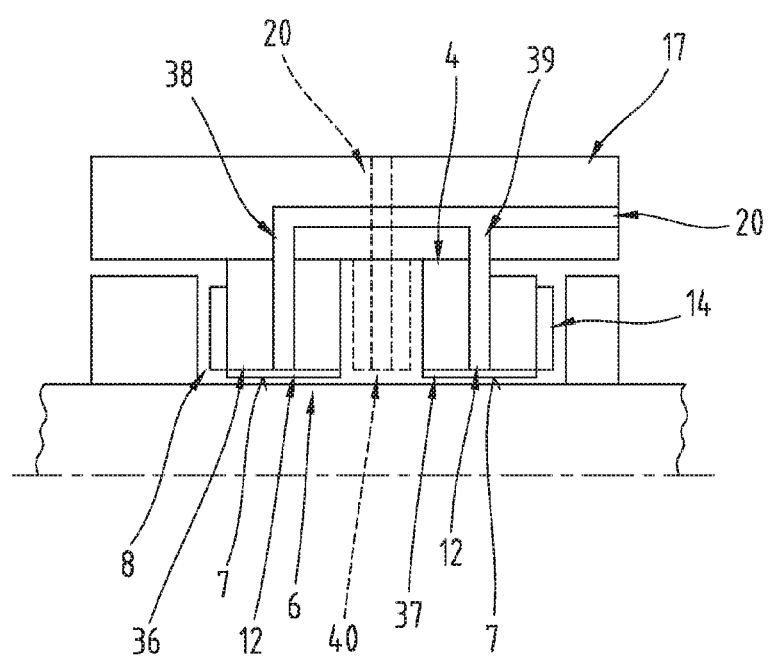

SLIDE BEARING SET

CROSS REFERENCE TO RELATED APPLICATIONS

This application is the National Stage of PCT/AT2014/050028 filed on Jan. 27, 2014, which claims priority under 35 U.S.C. §119 of Austrian Application No. A 50064/2013 filed on Jan. 30, 2013, the disclosure of which is incorporated by reference. The international application under PCT article 21(2) was not published in English.

The invention relates to a slide bearing set comprising a slide bearing combination consisting of a radial bearing with a radial bearing slide surface and a first axial bearing with an axial bearing slide surface, wherein the first axial bearing is arranged in an axial direction next to the radial bearing and comprising a lubricant supply device which comprises a supply line for a lubricant to the radial bearing slide surface of the radial bearing. Furthermore, the invention relates to a wind turbine gear mechanism comprising at least one gearwheel which is mounted on an axle by a slide bearing set.

Known slide bearing applications in mechanical and automotive engineering mostly require bearing solutions which are designed either for high axial or high radial forces and loads in a "secondary direction" have a subordinate role. In the main gear mechanisms of wind turbines, because of oblique toothings and because of large elastic deformations, forces are created in both axial and radial direction in the same order of magnitude. The need to provide a structure in a wind gear mechanism that is as compact and simple as possible does make it possible to separate the bearing points spatially and thereby makes it more difficult to separate the hydraulic systems.

In a fixed bearing arrangement with slide bearings, such as e.g. in a planetary gear bearing or spur gear stages, consisting of two axial thrust washers and a radial bearing, a suitable oil supply needs to be ensured to all of the contact partners. By virtue of the principle of functioning of a hydrodynamic slide bearing, the drag flow, there needs to be a flow of oil to each bearing point. Suitable pressure levels are defined at the oil inlet and outlet cross sections. In the case of jointly supplying oil to the three bearing points with distribution into three separate oil flows before the bearing inlets there is a possibility that the oil flows may not be distributed in the required manner and in an extreme case the contacting surfaces may dry out. In this case the functioning of the hydrodynamic slide bearings is no longer guaranteed.

In EP 2 284 420 B1 various different types of gear mechanisms or designs of gear mechanisms are described for use in wind turbines. In paragraphs [0002] to [0013] of this document the requirements of and the problems associated with individual bearings for the gear shafts or axles are described. Reference is made to this document to avoid repetition.

From EP 2 383 480 A1 a planetary gear for a wind turbine is known comprising at least one sun gear, a hollow gear and a planet support, in which a plurality of planetary gears are mounted, a plurality of radial slide bearings for supporting the planetary gears, which each comprise a sleeve made from a slide bearing material which is either secured as an inner ring onto a planetary gear axle or is mounted as an outer ring in a bore of a planetary gear, wherein an associated outer or inner bearing ring is formed either by the bore of the planetary gear or by the planetary gear axle, a plurality of axial slide bearings for supporting the planetary gears, which each comprise a first bearing element made from a slide bearing material which is applied to a contact surface between a planet support flank and an end side of a planetary gear either on the planet support flank or onto the end side of the planetary gear, whereby an associated second bearing element is formed either by the end side of the planet or by the planet support flank.

In this document three different possibilities are described for lubricating the slide bearing.
1. Pressure lubrication for the operation of the gear under load. The slide bearings are supplied with pressure oil from the planetary gear axle. The pressure oil supply is provided about 90° before the maximum loading area of the bearing.
2. Immersion lubrication for the gear mechanism without loading. The slide bearings are supplied with oil via an oil reservoir in the planetary gear axle. The oil reservoir is filled with oil by immersing the planetary gear axle into the oil sump and conveys said oil to the slide bearing. The oil supply is performed about 110° before the maximum loading area of the bearing. The discharge of oil is ensured by means of the hydraulic connection of the pressure lubrication and immersion lubrication.
3. Oil store for the load-free operation of the gear mechanism. The radial slide bearings are provided with oil storing edges at the end sides of the planetary gears so that there is always a defined oil level in the radial slide bearing. In this way the lubrication of the radial slide bearing is ensured in the load-free state.

For the pressure lubrication of the axial and/or radial slide bearing an oil distributor ring can be provided which radially surrounds a sun gear axle and has a connection to an oil supply channel in a gear housing, wherein at least one oil distribution channel is provided in the planet support which is connected to the oil distribution ring and ends at a lubrication point for a planetary gear bearing. In this case in the planetary gear axles two radially extending bores can be provided which come from an oil distribution channel section parallel to the planetary gear axle, and the sleeves each have two lubricant collecting devices, between which a peripheral lubricant supply groove is formed.

For the immersion lubrication of the axial and/or radial slide bearings a bore can be provided in the planetary gear axles respectively which forms an oil reservoir which can be filled by immersing the respective planetary gear axle into an oil sump. In this case a radially extending bore can be provided in the planetary gear axles which comes from the oil reservoir and ends at the sleeve. The sleeves can also comprise a lubricant collecting device formed by a recess on the sleeve in an area in which the bore coming from the oil reservoir ends.

DE 199 60 157 A1 describes the lubricant supply of a planetary gear for supplying lubricant moved by centrifugal force to the bearings of planetary gears of a first planet set to first planet shafts mounted at one end on a wall of a planet support and for supplying the lubricant to bearings of planetary gears of a second planet set separated at least in longitudinal direction by the wall of the planet support from the first planet set, comprising a first guiding device directing the lubricant to the first planet shaft, with at least one channel leading through the wall into the first planet shaft, with at least one transverse channel coming from the channel and guiding the lubricant to the bearing of the planetary gear of the first planet set and with a second guiding device arranged on the side of the second planet set.

DE 10 2010 000 809 A1 describes a compact radial axial bearing with a radial cylindrical roller bearing receiving radial forces with an outer ring and an inner ring and an axial cylindrical roller bearing receiving axial forces with a first disc formed as a shaft disc and a second disc designed as a housing disc, wherein the outer ring comprises a recess and the first disc and first cylinder roller and cage assembly are arranged in said recess such that a first side of the first disc is supported in axial direction on the inner ring of the radial cylindrical roller bearing, a second side of said disc forms a first track for the first cylinder roller and cage assembly and a spacer disc is arranged bearing directly on said second side, wherein the second disc is arranged concentric to the spacing disc and with a first side forms a second track for the first cylinder roller and cage assembly and with a second side forms a third track for a second cylinder roller and cage assembly, adjacent to the second disc a third disc formed as a shaft disc is arranged, a first side of said disc forms a fourth track for the second cylinder roller and cage assembly and the spacer disc is arranged bearing directly on said first side, and wherein a tensioning means bears against the second side of the third disc, by means of which a force can be applied in axial direction of a shaft.

For supplying lubricant the radial cylindrical roller bearing comprises channels which can be connected to the axial cylindrical roller bearing. Alternatively or in combination, the lubricant can also be supplied by the free spaces in the region of the recess and the gap between the spacer disc and the second disc.

DE 195 46 974 A1 describes a radial slide bearing for electrical machines containing a bearing housing, at least one fixed lubrication ring which is secured coaxially onto a shaft, and at least one bearing shell arranged inside the bearing housing in which the shaft is rotatably mounted, wherein the bearing housing has a radial partition plane and the bearing shell is a thin-walled bearing shell. The solid lubrication ring is in contact with an oil scraper by means of which oil conveyed by the solid lubrication ring from an oil sump can be scraped into an oil channel, which connects the oil scraper and a surface of the thin-walled bearing shell by flow so that oil scraped from the oil scraper lubricates the surface of the thin-walled bearing shell.

From DE 43 36 915 A1 a combination of a radial slide bearing and axial slide bearing is known in which at least one annular axial slide bearing element of at least one axial slide bearing, which is provided with at least one axial slide bearing surface, is arranged at the end of a radial slide bearing shell and is secured to the radial slide bearing shell. The radial slide bearing shell comprises at least one lubricating pocket for supplying oil to the radial slide bearing surface. The axial slide bearing surface comprises a plurality of wedge-like or pocket-like oil running surface sections for forming a lubricant oil film or lubricant oil cushion between said axial slide bearing surface and a slide bearing counter surface by rotating both surfaces relative to one another.

The objective of the invention is to create a compact slide bearing for a wind turbine or a wind turbine gear mechanism with a simple lubricant supply to the bearing surfaces of the slide bearing.

Said objective of the invention is achieved in the aforementioned slide bearing set in that in the radial bearing at least one first transversal groove is formed so that at least some of the lubricant is diverted in the direction of the axial bearing and the first axial bearing is supplied with lubricant solely via the radial bearing.

Furthermore, the objective of the invention is achieved by the aforementioned wind turbine gear mechanism in which the slide bearing set is designed according to the invention.

The invention uses to its advantage various unfavorable hydrodynamic principles in which all of the necessary flow to the radial and axial bearings is supplied centrally via the slide bearing with the greater pressure level, i.e. the radial bearing, and from the latter the slide bearing is supplied with the lower pressure level. The much lower need for lubricant of the radial bearing is compensated by the transversal groove. In this way without controlling the pressure or volume flow via the transverse flow of the radial bearing and the transversal groove the axial bearing is supplied with the necessary volume flow. It is an advantage in this case that by means of a single introduction point for the lubricant into the area of the bearing surface of the radial slide bearing, the bearing surface of the axial bearing can also be supplied with lubricant, so that it is not necessary to have a complicated construction with an additional lubricant supply for the axial slide bearing surface. In this case the volume flow to the axial slide bearing surfaces can be easily adjusted by the cross section of the at least one transversal groove. Furthermore, it is possible to reduce losses as because of the low transverse flow of the radial slide bearing, the hydrodynamic losses can only be eliminated insufficiently in particular in a fast-running drive stage of a wind turbine gear mechanism. In addition, by means of said lubricant supply of the slide bearing it is possible to achieve better cooling of the radial slide bearing because of the increased throughput of lubricant.

According to a preferred embodiment variant the slide bearing set in addition to the first axial bearing also comprises a second axial bearing, wherein said second axial bearing is also arranged next to the radial bearing and is separated from the first axial bearing by the radial bearing. In this way a fixed bearing that is simple to lubricate can be provided, in particular for a wind turbine gear mechanism.

It is an advantage if the second axial bearing is only supplied with lubricant via the radial bearing by at least one second transversal groove, whereby the aforementioned effects can be improved further, in particular improved cooling of the radial slide bearing.

In this case the at least one first transversal groove is designed to be asymmetric to at least one second transversal groove. By means of this structural configuration of the transverse grooves the bearing loads can be supported without much effort, in that the volume flows of lubricant can be adjusted to the respective requirements of the individual slide bearings.

In particular it is the case that the at least one first transversal groove has a smaller flow cross section than the at least one second transversal groove. In this way it is possible to build up different pressure levels by means of the flow cross sections and different volume flows, whereby the risk of sliding surfaces becoming dry can be reduced more effectively. By having a smaller outlet cross section in the direction of the unloaded axial bearing the oil volume flow and thereby the losses with an unloaded bearing are minimal.

It is also possible alternatively or in addition that the at least one first transversal groove in circumferential direction of the radial slide bearing is designed to be offset by a predefinable angle to at least one second transversal groove. By means of this embodiment variant it is possible particularly in the start-up phase for the lubricant to be supplied in a time sequence so that more loaded bearing surfaces are preferably supplied with the lubricant.

According to another embodiment variant the first axial bearing forms a first lubricant gap and the second axial bearing forms a second lubricant gap, wherein the first lubricant gap has a smaller flow cross section than the second lubricant gap. In this way the transverse flows of lubricant in both directions to the axial slide bearing can be controlled more effectively.

In order to always achieve the compactness of the slide bearing and thus always to improve the design of the lubricant supply to the individual sliding surfaces it is preferable that the first and the second axial slide bearing are arranged immediately adjacent to the radial slide bearing.

It is also possible for the radial slide bearing to be divided into two part radial slide bearings arranged next to one another in axial direction. In this way the supply of lubricant to the radial slide bearing can be improved, as by separating into two part radial slide bearings the sliding surface of an individual part radial slide bearing is smaller and thus the lubricant can be distributed more rapidly to the whole bearing surface. In addition, it also possible to provide very wide bearing points according to the invention, as only one axial slide bearing has to be supplied with lubricant via a part radial slide bearing.

It is possible in this case that the supply line for the lubricant is arranged between the two part radial slide bearings, whereby the structural effort of supplying lubricant can also be reduced with very wide bearing points.

For a better understanding of the invention the latter is explained with reference to the following Figures.

In a schematically simplified representation:

FIG. 1 shows a cross section of a wind turbine gear mechanism in the region of a slide bearing in side view;

FIG. 2 shows a radial slide bearing with a view of the sliding surface;

FIG. 3 shows an embodiment variant of a radial slide bearing with a view of the sliding surface;

FIG. 4 shows a cross section of an embodiment variant of a wind turbine gear mechanism in the area of a slide bearing in side view.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

FIG. 1 shows a cross section of a section of a wind turbine gear mechanism 1. The wind turbine gear mechanism 1 is designed in the form of a (simple) planetary gear.

It is known that wind turbines comprise a tower, at the upper end of which a gondola is arranged in which the rotor with rotor blades is mounted. Said rotor is operatively connected by a gear mechanism to a generator which is also located in the gondola, wherein by means of the gear mechanism the low speed of the rotor is translated into the higher speed of the generator rotor. As such embodiments of wind turbines form part of the prior art reference is made here to the relevant literature.

The wind turbine gear mechanism 1 comprises at least one gearwheel 2. Said gearwheel 2 is arranged in the wind turbine gear mechanism 1 in meshing engagement between a second and a third gearwheel (both not depicted). In addition, the at least one gearwheel 2 comprises an outer spur gearing 3.

In the embodiment of the wind turbine gear mechanism 1 as a planetary gear, in particular as a main gear mechanism of a wind turbine, the second gearwheel is configured as a sun gear with a spur toothing, which is connected in a rotationally secure manner to a shaft which leads to the generator rotor. The sun gear is usually surrounded by a plurality of gearwheels 2, the planetary gears, for example two, preferably three or four.

The third gearwheel is configured as a hollow gear which surrounds the at least one gearwheel 2 or the gearwheels 2 in radial direction and which comprises a toothing on at least part of an inner surface which is in meshing engagement with the outer spur gearing 3 of the gearwheel 2 or gearwheels 2. The hollow gear is connected in a rotationally secure manner to a rotor shaft of the rotor of the wind turbine or in a rotationally secure manner to the housing of the wind turbine gear mechanism 1.

The toothings of the gearwheels in the wind turbine gear mechanism 1 can be designed to be straight or oblique.

The at least one gearwheel 2 (in the following only one gearwheel 2 is described, wherein said embodiments can also be applied to all or a plurality of gearwheels 2) is mounted by a slide bearing set 4 on an axle 5, for example a planetary shaft (the so-called planetary axle). Said axle 5 can either be designed in one piece with at least part of a gearwheel support, in particular a planet support, or is inserted as a separate component into bores of the gearwheel support.

It should be noted that it is possible to have not only single stage embodiments of such wind turbine gear mechanisms 1 within the scope of the invention, but multi-stage, for example two or three-stage embodiments are possible, whereby additional spur gear stages can be integrated into at least one gearwheel 2, in particular a planetary gear. In addition, parallel gear mechanisms are also possible within the scope of the invention, as described for example in the aforementioned EP 2 284 420 B1. Reference is therefore made to this document which is associated in this regard with the present description. Accordingly, the wind turbine gear mechanism 1 can comprise a single planetary gear and a parallel two or multi-stage planetary gear or generally a plurality of planetary gears.

Furthermore, it should be noted that the invention is not only used in the planetary gears of wind turbines, but can be used generally in gear mechanisms for wind turbines for gear mechanism shafts, in particular for translating the slow speed of the rotor of a wind turbine to a higher speed, or in the bearing of shafts in wind turbines, for example the rotor shaft or shaft, that supports the hollow gear of a planetary gear.

In addition, it should be noted that in this description the terms axle and shaft are used synonymously.

The slide bearing set 4 comprises at least one radial bearing 6 (in the following synonymous with a radial slide bearing) with a radial bearing slide surface 7 and a first axial bearing (in the following synonymous with an axial slide bearing) 8 with an axial bearing slide surface 9.

The first axial bearing 8 is arranged in axial direction 10 next to the radial bearing 6, wherein in the example embodiment according to FIG. 1 it is arranged immediately adjacent to the radial bearing 6. In addition, the slide bearing set 4 comprises a support element 11 on which on the radially inner side the radial bearing 6 is arranged and on one of the axial end faces the axial bearing is arranged.

However, it is also possible, as explained in more detail in the following, that at least the radial bearing 6 is designed as a multi-layered slide bearing. In this case the support element 11 can form the carrier layer or the rear bearing of the radial slide bearing 6.

It is also indicated by dashed lines in FIG. 1 that in the case of a multilayered slide bearing the radial bearing 6 can also comprise a separate support layer 13 in addition to a sliding layer 12. In this case the radial bearing 6 is arranged above said support layer 13 on the support element 11.

It should also be noted however that generally on the back of the bearing of the radial bearing 6 and/or the axial bearing 8 an anti-fretting layer can be arranged, as known from slide bearing technology.

In the embodiment variant of the slide bearing set 4 according to FIG. 1 the latter preferably comprises a second axial bearing 14 next to the first axial bearing 8. Said second axial bearing 14 is also arranged next to the radial bearing 6 in axial direction 10, in particular immediately next to the radial bearing 6, wherein preferably the second axial bearing 14 is arranged on the support element 11 or the support layer 13 of the radial bearing 6. In this case the second axial bearing 14 is separated by the radial bearing 6 from the first axial bearing 8. The first axial bearing 8 can thus be arranged on a first axial end face 15 and the second axial bearing 14 can be arranged on a second axial end face 16 of the support element 11 or the support layer 13.

The slide bearing set 4 is arranged in a housing 17 and preferably connected to the latter, for example in the form of a press-fit or by means of a material bonded and/or form bonded connection.

When using the slide bearing set 4 for supporting the gearwheel 2 of the wind turbine gear mechanism 1 it is possible to omit the housing and the slide bearing set 4 can be connected directly to the gearwheel body, i.e. arranged in a bore of the gearwheel 2, whereby the connection technology referred to for connecting the slide bearing set 4 to the gearwheel 2 can be used.

In general, it is preferable if the slide bearing set 4 is connected to the gearwheel 2 or the housing 17 only via the support layer 13 of the radial bearing 6 or the support element 11.

Preferably, the first axial bearing 6 and the second axial bearing 14 are arranged spaced apart from the housing 17 or the gearwheel 2.

Although the first axial bearing 8 and/or the second axial bearing 14 preferably only comprise the sliding layer 12, the latter can—as shown by dashed lines in FIG. 1—also be designed as a multilayered slide bearing and in addition to the sliding layer 12 can comprise at least the support layer 13.

Preferably, the slide bearing set 4 is used to form an (exclusively) hydrodynamic fixed bearing. In addition, a first thrust collar 18 and a second thrust collar 19 can be arranged on the axle 5. The latter can either be secured to the axle 5 or designed in one piece with the latter. If necessary, the thrust collars 18, 19 can also be secured to the housing 17 or designed in one piece with the latter.

The slide bearing set 4 also comprises a lubricant supply device, which is not shown in more detail in FIG. 1 with the exception of part of a supply line 20 for the lubricant, in particular a lubricant oil.

The supply line 20 is guided through the housing 17 and if necessary the gearwheel 2 and is formed as a bore in the latter. If no housing 17 is used the shown part of the supply line 20 can also be arranged only in the gearwheel 2.

The supply line 20 opens in the radial slide bearing surface 7 of the radial bearing 6, so that the lubricant is supplied via the supply line 20 to said radial slide bearing surface 7 according to arrow 21. Preferably, the supply line 20 is arranged in the upper, less stressed area of the slide bearing set 4, as shown in FIG. 1.

The supplied lubricant spreads over the radial bearing slide surface 7 to form a lubricant film between the latter and the axle 5.

In addition, according to the invention lubricant is supplied to the first axial bearings 8 and in particular also the second axial bearing 14 via the supply line 20, so that no additional supply lines are formed for the lubricant to said axial bearings 8, 14. In other words, the first axial bearing 8 and in particular also the second axial bearing 14 are supplied with lubricant only via the radial bearing 6.

In addition, in the radial bearing slide surface 7 at least one first transversal groove 22 is formed, as shown in FIG. 2, which shows the radial bearing 6 in plan view on the radial slide bearing surface 7. Via said first transversal groove 22 at least a portion of the lubricant is diverted according to arrow 23 (FIG. 1) in the direction of the axial bearing.

To supply the second axial bearing 14 in the radial bearing slide surface 7 at least one second transversal groove 24 is formed. Said second transversal groove 24 is only formed however if the slide bearing set 4 (FIG. 1) comprises two axial slide bearings.

The transversal grooves 22, 24 are designed to be open in the region of the radial bearing slide surface 7 and extend from the opening of the feed line 29 into the axial end faces 25 or 26 of the radial bearing 6.

In order meet the lubrication needs of the axial bearing 8 or 14 more effectively, the at least one first transversal groove 22 and the at least one second transversal groove 24 can be designed to be asymmetric to one another. For example, the first transversal groove 22 can comprise a first flow cross section 27 and the second transversal groove 24 can comprise a second flow cross section 28, wherein the first flow cross section 27 is smaller than the second flow cross section 28, as shown in FIGS. 2 and 3. The first flow cross section 27 can differ with respect to the width and/or depth and/or cross sectional shape of the transversal groove 22 from the second flow cross section 28.

In general the transversal grooves 22 and 24 are preferably produced by machining the sliding layer 12.

The transversal grooves 22, 24 can have a width in circumferential direction of the radial bearing 6 which corresponds to an angle selected from a range of 1° to 20°.

Furthermore, the transversal grooves 22, 24 can have a depth in radial direction which is selected from a range of 1% to 100% of the wall thickness of the axial bearing 8 or 14.

The cross-sectional shape of the transversal grooves 22, 24 can be rectangular, square, triangular, polygonal, etc., wherein rectangular or square or triangular shapes are preferred.

Furthermore, the edges, which are formed at the transitions of the wall of the transversal grooves 22, 24, can be rounded in order to thus improve the flow behavior of the lubricant.

As shown in FIG. 3, in circumferential direction of the radial bearing 6 a plurality of transversal grooves 22 and/or transversal grooves 24 are arranged lying next to one another and spaced apart from one another. It is also possible that the number of first transversal grooves 22 differs from the number of second transversal grooves 24 in the radial bearing slide surface 7.

In general, the number of first transversal grooves 22 can also be selected from a range of 1 to 4.

The number of second transversal grooves 24 can also be selected from a range of 1 to 4.

Either more first transversal grooves 22 or more second transversal grooves 24 can be formed in the radial bearing slide surface 7, whereby in this connection with regard to the number of transversal grooves 22 and/or transversal grooves 24 if necessary the flow cross section 27 or 28 can also be taken into account. With a larger flow cross section 27 or 28 the number of transversal grooves 22 or 24 can be reduced and vice versa.

In addition, it is possible that the transversal grooves 22 and/or 24 arranged next to one another in circumferential direction of the radial bearing 6 can differ from one another with respect to the width and/or depth and/or the cross sectional form. For example, the width and/or the depth can be greater in the direction of the most loaded area of the radial bearing 6, which is usually in the not shown lower area of the slide bearing. Likewise, the cross sectional form as viewed in circumferential direction of the radial bearing 6 can differ, for example it can have a triangular cross sectional form in the upper area and a rectangular cross sectional form in the lower area of the radial bearing 6.

The terms "top" and "bottom" relate to the installation position of the radial bearing 6, so that "top" denotes the area above the axle 5 (FIG. 1) and "bottom" denotes the area below the axle 5.

It is indicated by dashed lines in FIG. 3 that the first transversal groove 22 and/or the second transversal groove 24 can be designed not only as axial grooves, but can also have a different direction than the axial direction.

For example, the first transversal groove 22 and/or the second transversal groove 24 can be oblique and form an angle 29 to the axial direction 10. Likewise, the first transversal groove 22 and/or the second transversal groove 24 can have a curved shape. Mixed forms are also possible, as a mixture of first transversal grooves 22 and/or the second transversal grooves 24 in axial direction and obliquely to the axial direction or in a curved form, wherein also the direction of a plurality of first transversal grooves 22 and/or a plurality of second transversal grooves 24 can differ in circumferential direction of the radial bearing 6, for example a first transversal groove 22 and/or a second transversal groove 24 runs in axial direction in the area of the crown of the radial bearing 6 and a further first transversal groove 22 and/or second transversal groove 24 runs obliquely or in a curved form in an area different from the crown of the radial bearing 6.

It is also possible that a plurality of first transversal grooves 22 and/or second transversal grooves 24 are flow-connected to one another by an additional groove in circumferential direction of the radial bearing 6 or obliquely to the circumferential direction of the radial bearing 6.

As shown in FIG. 3 the at least one second transversal groove 24 is offset in circumferential direction of the radial bearing 6 by a predefinable angle relative to the at least one first transversal groove 22. The angle can be selected from a range of 2° to 20°.

FIG. 3 shows a further embodiment variant of the lubricant distribution. In this case the supply line 20 opens into a distribution groove 30 which extends for example with its longitudinal extension in the circumferential direction of the radial bearing 6. The at least one first transversal groove 22 and if necessary the at least one second transversal groove 24 then extend from said distribution groove 30 into the end faces 25 and possibly 26 of the radial bearing 6. Said embodiment variant can be provided in particular if a plurality of first transversal grooves 22 and possibly a plurality of second transversal grooves 24 are provided.

As shown in FIG. 1, the first axial bearing 8 is arranged spaced apart from the thrust collar 18 with the formation of a first lubricant gap 31 and the second axial bearing 14 is arranged spaced apart from the thrust collar 19 with the formation of a second lubricant gap 31. In this case the first lubricant gap 31 can have a smaller flow cross section than the second lubricant gap 32, i.e. the distance between the axial bearing slide surface 7 of the first axial bearing 6 and the thrust collar 18 can be smaller than the distance between an axial bearing slide surface 33 of the second axial bearing 14 and the thrust collar 19.

The thrust collar 18 can be arranged spaced apart from the housing 17 or the gearwheel 2, whereby between the latter a flow channel 34 is formed by means of which the lubricant can be removed according to arrow 35 from the area of the slide bearing set 4. The removed lubricant can be supplied to a corresponding collecting device in order to introduce it from there back into the lubricant circuit, if necessary after cooling.

The same applies to the thrust collar 19.

FIG. 4 shows a section of a further embodiment variant of the slide bearing set 4. Unlike the embodiment variant according to FIG. 1 the radial bearing 6 is divided into at least two part radial slide bearings 36, 37 arranged next to one another in axial direction 10, wherein between the latter an intermediate chamber is formed. The two part radial slide bearings 36, 37 can be designed according to the above description as single-layered or multilayered slide bearings.

The first axial bearing 8 is arranged in this embodiment variant on the left partly radial slide bearing 36 in FIG. 4 and the second axial bearing 14 is arranged accordingly on the right partly radial slide bearing 37 in FIG. 4. As for each partly radial slide bearing 36, 37 only one axial bearing 8 or 14 is provided respectively, the partly radial slide bearing 36 thus preferably comprises only the transversal grooves 22 (e.g. FIG. 2) and the partly radial slide bearing 37 only comprises the transversal grooves 24 (e.g. FIG. 2) in order to supply the axial bearing 8 or 14 with lubricant via the latter.

The lubricant supply of the two radial bearing slide surfaces 7 is performed via the supply line 20, which is designed in this case preferably as an axial bore, e.g. in the housing 17, which branches off from the radial bores 38, 39 which lead to the radial bearing slide surfaces 7.

Alternatively, —as shown by dashed lines in FIG. 4—the supply line 20 for the lubricant can also be arranged between the two part radial slide bearings 36, 37. In this case between the two part radial slide bearings 36, 37 a supply web 40 can be arranged on the housing, which extends into the area of the part radial slide bearing 36, 37. The transversal grooves 22 or 24 extend over the whole axial extension of the sliding layers 12 of the part radial slide bearings 36, 37.

The radial bearing 6 or the partly radial slide bearing 36, 37 can be designed in principle in the form of slide bearing half shells. Preferably, the latter can be designed as bearing bushes however.

A multilayered slide bearing within the meaning of this description consists of at least the support layer 13 and a sliding layer 12, which is applied onto the support layer 13. The sliding layer 12 thereby forms the running surface for the axle 5.

In addition to this two-layered design of the multilayered slide bearing it is also possible within the scope of the invention to arrange intermediate layers between the sliding layer 12 and the support layer 13, for example a bearing metal layer and/or at least one bonding layer and/or diffusion barrier layer.

Examples of materials for the individual layers of the multilayered slide bearing are described in AT 509 624 B1, which is referred to here and in this regard is associated with the description of the present invention.

Lastly, as a point of formality it should be noted that for a better understanding of the structure of the wind turbine gear mechanism 1 the latter and/or its components have not been represented to scale and/or have been enlarged and/or reduced in size.

| List of Reference Numerals | |
|---|---|
| 1 | wind turbine gear mechanism |
| 2 | gearwheel |
| 3 | outer spur gearing |
| 4 | slide bearing set |
| 5 | axle |
| 6 | radial bearing |
| 7 | radial bearing slide surface |
| 8 | axial bearing |
| 9 | axial bearing slide surface |
| 10 | axial direction |
| 11 | support element |
| 12 | sliding layer |
| 13 | support layer |
| 14 | axial bearing |
| 15 | end face |
| 16 | end face |
| 17 | housing |
| 18 | thrust collar |
| 19 | thrust collar |
| 20 | supply line |
| 21 | arrow |
| 22 | transversal groove |
| 23 | arrow |
| 24 | transversal groove |
| 25 | end face |
| 26 | end face |
| 27 | flow cross section |
| 28 | flow cross section |
| 29 | angle |
| 30 | distribution groove |
| 31 | lubricant gap |
| 32 | lubricant gap |
| 33 | axial bearing slide surface |
| 34 | flow channel |
| 35 | arrow |
| 36 | part radial slide bearing |
| 37 | part radial slide bearing |
| 38 | radial bore |
| 39 | radial bore |
| 40 | supply web |

The invention claimed is:

1. A slide bearing set comprising a slide bearing combination comprising a radial bearing with a radial bearing slide surface and comprising a first axial bearing with an axial bearing slide surface, wherein the first axial bearing is arranged next to the radial bearing in an axial direction, and with a lubricant supply device, which comprises a supply line for a lubricant to the radial bearing slide surface of the radial bearing, wherein at least one first transversal groove is disposed in the radial bearing such that at least a portion of the lubricant is diverted towards the first axial bearing and the first axial bearing is supplied with the lubricant solely via the radial bearing.

2. The slide bearing set as claimed in claim 1, further comprising a second axial bearing wherein the second axial bearing is also arranged next to the radial bearing and is separated from the first axial bearing by the radial bearing.

3. The slide bearing set as claimed in claim 2, wherein the second axial bearing is supplied with lubricant solely via the radial bearing via at least one second transversal groove.

4. The slide bearing set as claimed in claim 3, wherein the at least one first transversal groove is designed to be asymmetric to the at least one second transversal groove.

5. The slide bearing set as claimed in claim 4, wherein the at least one first transversal groove has a smaller flow cross section than the at least one second transversal groove.

6. The slide bearing set as claimed in claim 3, wherein the at least one first transversal groove is formed in a circumferential direction of the radial bearing and offset by a predefinable angle to the at least one second transversal groove.

7. The slide bearing set as claimed in claim 2, wherein the first axial bearing forms a first lubricant gap and the second axial bearing forms a second lubricant gap, wherein the first lubricant gap has smaller flow cross section than the second lubricant gap.

8. The slide bearing set as claimed in claim 2, wherein the first and the second axial bearing are arranged directly adjacent to the radial bearing.

9. The slide bearing set as claimed in claim 1, wherein the radial bearing is divided into two partly radial slide bearings arranged next to one another in axial direction.

10. A wind turbine gear mechanism comprising at least one gear wheel, which is mounted on an axle via a slide bearing set, wherein the slide bearing set is designed according to claim 1.

\* \* \* \* \*